Jan. 3, 1933.  G. E. PORTER  1,893,150
VEHICLE SPRING
Filed March 20, 1931
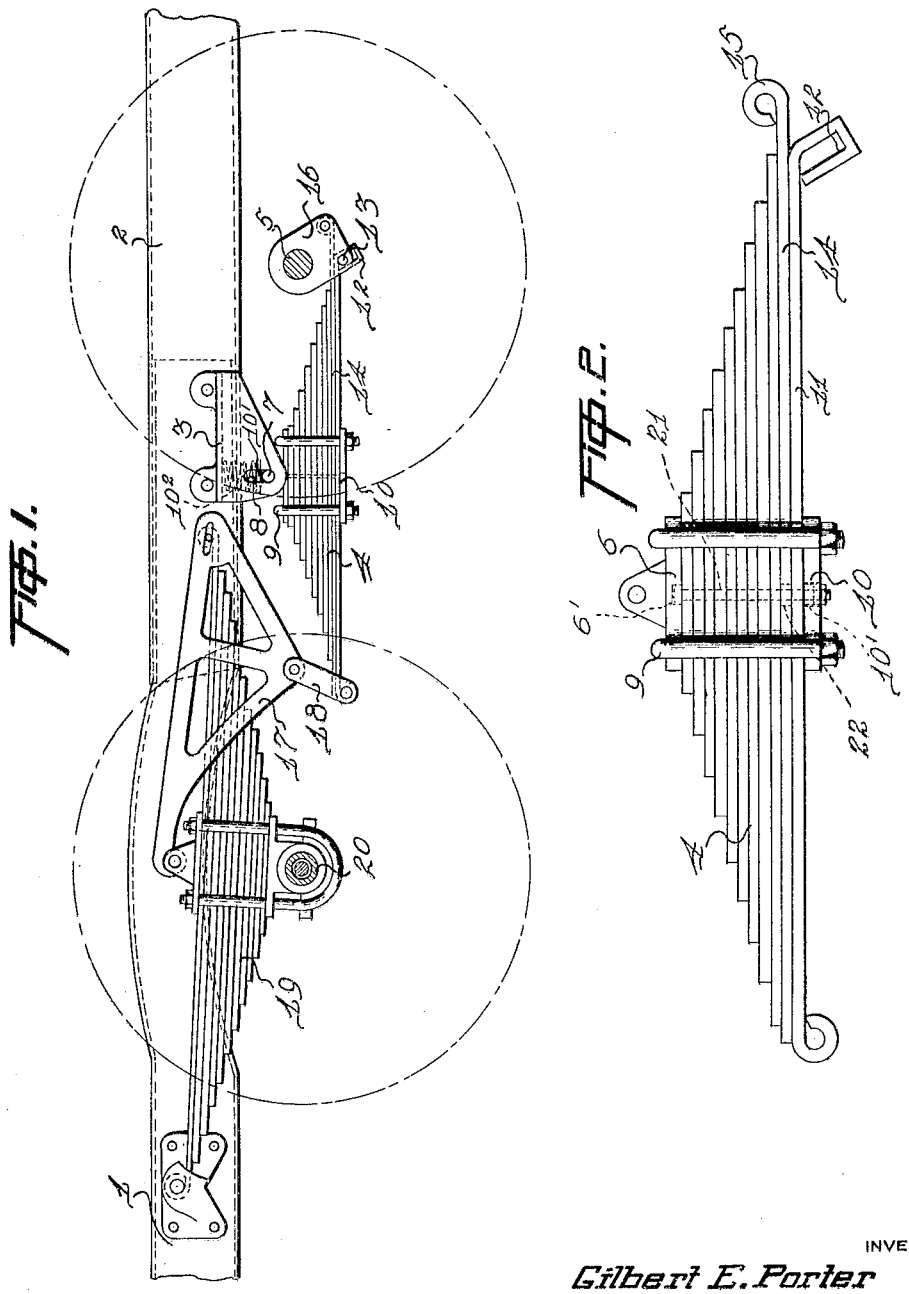
INVENTOR
*Gilbert E. Porter*
BY
ATTORNEYS Patented Jan. 3, 1933

1,893,150

UNITED STATES PATENT OFFICE

GILBERT E. PORTER, OF DETROIT, MICHIGAN, ASSIGNOR TO THE TIMKEN-DETROIT AXLE COMPANY, OF DETROIT, MICHIGAN

VEHICLE SPRING

Application filed March 20, 1931. Serial No. 524,048.

The present invention pertains to a novel spring of a type providing a resilient flexible connection between an extension frame attached to the frame of a vehicle and an auxiliary axle of a type employed to convert a four wheel vehicle into one of the six wheel type for carrying heavier loads than are permitted on four wheel vehicles under statutory road protecting regulations although its application is not confined to this use alone for it would be equally serviceable for the same purpose with all types of trailing vehicles.

The primary object of the present invention is to provide a spring of a type employed in the above stated use which supports the auxiliary axle in a resilient manner tending to avoid transmitting road shocks to the vehicle frame and in a manner avoiding the use of radius rods in the attachment of said auxiliary axle. The spring is connected to the auxiliary axle by means of a suitable casting serving as a shackle and the novelty in the present spring is in providing a plurality of connections to said shackle casting, one of said connections being in the nature of a floating attachment while the other is rigid, the rigid connection serving as a radius rod. In other words the spring serves as a radius rod for the auxiliary axle and in so doing the spring is utilized to absorb the torsional stress set up when the vehicle is traveling out of a straight line, such as in turning a corner.

With the above and other ends in view the invention consists in the matters hereinafter set forth and more particularly pointed out in the appended claims reference being had to the accompanying drawing, in which Figure 1 is a fragmentary side elevation of a road vehicle illustrating the manner in which the present spring is employed to support the auxiliary axle, and Fig. 2 is a side elevation of the present spring removed from the vehicle.

Like characters are employed throughout to designate the corresponding parts.

The numeral 1 indicates the frame of any conventional self-propelled vehicle having an extension frame 2 riveted or otherwise securely fastened thereto. To the frame extension 2 are riveted two brackets 3 that support the auxiliary axle springs 4 in oscillatory relation to the frame 2 and auxiliary axle 5. The upper spring clip holding plates 6 carry shafts 7, the ends of which are free to move up and down in elongated slots 8 in the brackets 3, the spring clips 9 and the bottom plate 10 serving to co-act with the upper plate 6 in holding the spring leaves together.

Above the shafts 7 and resting thereon are pivoted plates 10′ and between these plates and the under surface of the adjacent supporting bracket 3 are placed coiled compression cushioning springs $10^2$ possessing shock-absorbing stress-relieving characteristics that help to make the load ride easier and help to keep it level.

The foregoing sets forth a construction which has been incorporated in my previous patent application serial number 356,736 and the novelty in the present application pertains to the novel type of spring 4 and the remainder of the description is merely illustrative of its use.

The spring 4 has its bottom leaf shaped to form an opening 12 within which the spring shackle bolt 13 is free to move under torsional stress set up when the vehicle is traveling out of a straight line, such as in turning corners. The leaf 14 which lies directly above the leaf 11 is looped as at 15 to receive a shackle bolt 13 which secures it to the auxiliary spring seat castings or brackets 16, one of which is rigidly secured to the auxiliary axle and the other being left free to turn thereon.

The above constructed springs provide stress relief through flexibility of attachment to the members 16 and the leaf 14 takes the place of the otherwise necessary radius rod, and therein resides the utility in the present device.

As a means of compensating for dimensional variations that would make hard or impossible a satisfactory connection to the axle 5, the radius-rod leaf 14 instead of merely being pierced as are the other leaves, to receive the clamping bolt 21, is provided with a lengthwise slot 22 at bolt 21, so that upon loosening the clamp-bolt and spring-clip nuts the leaf 14 may be driven laterally in either direction, thus making possible an easy and quick connection to bracket 16. A recess 6' is provided in holding plate 6 for the head of the spring clamping bolt 21 and plate 10 is pierced by a hole 10' through which project the nuts on said spring clamping bolt.

The remainder of the construction necessary in supporting the present spring might, as illustrated, take the form of the load distributing bifurcated floating links 17 connected by the shackles 18 to the opposite end of the leaf 11, the floating link being attached to the spring 19 which is in turn connected to the axle 20 and to the vehicle frame 1.

Although a specific embodiment of the present invention has been illustrated and described it is to be understood that various changes may be made in the details of construction without departing from the spirit of the invention as set forth in the following claim, and such changes are contemplated.

What I claim is:

A spring comprising a plurality of leaves secured together by a clamping bolt, a centrally located lateral slot formed in the second leaf from the bottom through which said clamping bolt extends, said leaf being bent at its outer end to form an upwardly projecting loop, a bracket having a bolt which passes through said loop and which is rotatably supported thereby, the lowermost leaf of said spring being bent downwardly to form a loop having its longer dimension disposed in a plane at an angle relative to the plane of said lowermost leaf, a second bolt carried in said bracket and received in said elongated loop in a manner whereby said lowermost leaf does not resist rotation of said bracket on said first named bolt that is received in said loop in the second leaf from the bottom of the spring.

In testimony whereof I affix my signature.

GILBERT E. PORTER.